(12) United States Patent
Finlay et al.

(10) Patent No.: US 8,295,017 B2
(45) Date of Patent: Oct. 23, 2012

(54) ELECTRICAL WIRING DEVICE

(75) Inventors: David A. Finlay, Marietta, NY (US); Thomas N. Packard, Syracuse, NY (US)

(73) Assignee: Pass & Seymour, Inc., Syracuse, NY (US)

(*) Notice: Subject to any disclaimer, the term of this patent is extended or adjusted under 35 U.S.C. 154(b) by 427 days.

(21) Appl. No.: 12/618,453

(22) Filed: Nov. 13, 2009

(65) Prior Publication Data
US 2010/0053826 A1 Mar. 4, 2010

Related U.S. Application Data (63) Continuation of application No. 11/469,596, filed on Sep. 1, 2006, now Pat. No. 7,619,860, which is a continuation of application No. 10/884,304, filed on Jul. 2, 2004, now Pat. No. 7,133,266, which is a continuation of application No. 09/971,525, filed on Oct. 5, 2001, now Pat. No. 6,856,498, which is a continuation of application No. 09/718,003, filed on Nov. 21, 2000, now Pat. No. 6,522,510.

(51) Int. Cl.
*H02H 3/00* (2006.01)
(52) U.S. Cl. ........................................................ 361/42
(58) Field of Classification Search .................. None
See application file for complete search history.

(56) References Cited

U.S. PATENT DOCUMENTS

| | | | |
|---|---|---|---|
| 3,872,354 A | 3/1975 | Nestor | |
| 3,953,766 A * | 4/1976 | Howell et al. | 361/45 |
| 4,309,681 A | 1/1982 | Draper | |
| 4,345,289 A | 8/1982 | Howell | |
| 4,412,193 A | 10/1983 | Bienwald et al. | |
| 4,477,857 A | 10/1984 | Crocker | |
| 4,574,324 A | 3/1986 | Packard | |
| 4,598,331 A | 7/1986 | Legatti | |
| 4,618,907 A | 10/1986 | Leopold | |
| 4,979,070 A | 12/1990 | Bodkin | |
| 5,177,657 A | 1/1993 | Baer | |
| 5,202,662 A | 4/1993 | Bienwald | |
| 5,363,083 A | 11/1994 | Fischer | |
| 5,363,269 A | 11/1994 | McDonald | |
| 5,418,678 A | 5/1995 | McDonald | |
| 5,477,412 A | 12/1995 | Neiger | |

(Continued)

FOREIGN PATENT DOCUMENTS

WO 2007027908 A3 3/2007

(Continued)

*Primary Examiner* — Jared Fureman
*Assistant Examiner* — Terrence Willoughby
(74) *Attorney, Agent, or Firm* — Daniel P. Malley; Bond Schoeneck & King (57) ABSTRACT

The present invention is directed to an electrical wiring device that includes a plurality of line terminals including a line hot terminal and a line neutral terminal, and a plurality of load terminals including a load hot terminal and a load neutral terminal. An interrupting contact assembly includes four sets of interrupting contacts configured to provide electrical continuity at least between the line hot terminal and the load hot terminal and the line neutral terminal and the load neutral terminal in a reset state. The four sets of interrupting contacts are open in a tripped state. A miswire prevention arrangement is configured to prevent the interrupting contact assembly from maintaining the reset state when the load hot terminal and the load neutral terminal are connected to a source of AC power.

33 Claims, 5 Drawing Sheets

U.S. PATENT DOCUMENTS

| | | | |
|---|---|---|---|
| 5,541,800 | A | 7/1996 | Misencik |
| 5,594,398 | A | 1/1997 | Marcou |
| 5,600,524 | A | 2/1997 | Neiger et al. |
| 5,638,243 | A | 6/1997 | Torezan |
| 5,661,623 | A | 8/1997 | McDonald |
| 5,706,155 | A * | 1/1998 | Neiger et al. ................ 361/45 |
| 5,715,125 | A | 2/1998 | Neiger et al. |
| 5,729,417 | A | 3/1998 | Neiger et al. |
| 5,923,239 | A | 7/1999 | Krueger |
| 5,963,408 | A | 10/1999 | Neiger et al. |
| 6,040,967 | A | 3/2000 | DiSalvo |
| 6,043,966 | A | 3/2000 | Krueger |
| 6,052,265 | A | 4/2000 | Zaretsky |
| 6,111,733 | A | 8/2000 | Neiger et al. |
| 6,226,161 | B1 | 5/2001 | Neiger et al. |
| 6,246,558 | B1 | 6/2001 | DiSalvo |
| 6,262,871 | B1 | 7/2001 | Nemir |
| 6,317,307 | B1 | 11/2001 | Bone |
| 6,381,112 | B1 | 4/2002 | DiSalvo et al. |
| 6,407,893 | B1 | 6/2002 | Neiger |
| 6,433,977 | B1 | 8/2002 | Macbeth |
| 6,437,953 | B2 | 8/2002 | DiSalvo |
| 6,442,007 | B1 | 8/2002 | Li |
| 6,492,894 | B2 | 12/2002 | Bone |
| 6,522,510 | B1 | 2/2003 | Finlay |
| 6,587,319 | B1 | 7/2003 | Finlay |
| 6,590,753 | B1 | 7/2003 | Finlay |
| 6,628,486 | B1 | 9/2003 | Macbeth |
| 6,721,156 | B2 | 4/2004 | Masghati |
| 6,724,590 | B1 | 4/2004 | Radosavljevic |
| 6,734,769 | B1 | 5/2004 | Germain |
| 6,788,508 | B2 | 9/2004 | Papallo, Jr. |
| 6,850,394 | B2 | 2/2005 | Kim |
| 6,856,498 | B1 | 2/2005 | Finlay, Sr. |
| 6,867,954 | B2 | 3/2005 | Wu et al. |
| 6,900,972 | B1 | 5/2005 | Chan |
| 6,937,452 | B2 | 8/2005 | Chan |
| 7,009,473 | B2 | 3/2006 | Zhang |
| 7,082,021 | B2 | 7/2006 | Chan et al. |
| 7,084,725 | B2 | 8/2006 | Richter |
| 7,088,205 | B2 | 8/2006 | Germain |
| 7,088,206 | B2 | 8/2006 | Germain |
| 7,098,761 | B2 | 8/2006 | Germain |
| 7,099,129 | B2 | 8/2006 | Neiger |
| 7,116,191 | B2 | 10/2006 | Wang |
| 7,133,266 | B1 | 11/2006 | Finlay, Sr. |
| 7,149,065 | B2 | 12/2006 | Baldwin |
| 7,154,718 | B1 | 12/2006 | Finlay, Sr. |
| 7,161,780 | B2 | 1/2007 | Germain |
| 7,164,563 | B2 | 1/2007 | Chan |
| 7,167,066 | B2 | 1/2007 | Wang |
| 7,184,250 | B2 | 2/2007 | Bonilla |
| 7,187,526 | B2 | 3/2007 | DiSalvo |
| 7,195,500 | B2 | 3/2007 | Huang |
| 7,196,886 | B2 | 3/2007 | Chan |
| 7,209,330 | B2 | 4/2007 | DiSalvo |
| 7,212,386 | B1 | 5/2007 | Finlay, Sr. |
| 7,227,435 | B2 | 6/2007 | Germain |
| 7,239,491 | B1 | 7/2007 | Morgan |
| 7,256,973 | B1 | 8/2007 | Radosavljevic |
| 7,265,956 | B2 | 9/2007 | Huang |
| 7,283,340 | B1 | 10/2007 | Finlay, Sr. |
| 7,289,306 | B2 | 10/2007 | Huang |
| 7,292,419 | B1 | 11/2007 | Nemir |
| 7,295,410 | B1 | 11/2007 | Packard |
| 7,295,415 | B2 | 11/2007 | Huang |
| 7,298,598 | B1 | 11/2007 | Morgan |
| 7,307,821 | B2 | 12/2007 | Wang |
| 7,312,963 | B1 | 12/2007 | Radosavljevic |
| 7,315,227 | B2 | 1/2008 | Huang |
| 7,317,600 | B2 | 1/2008 | Huang |
| 7,336,457 | B2 | 2/2008 | Liscinsky |
| 7,336,458 | B2 | 2/2008 | Ziegler |
| 7,355,497 | B2 | 4/2008 | Germain |
| 7,355,827 | B2 | 4/2008 | Wang |
| 7,365,621 | B2 | 4/2008 | Germain |
| 7,375,938 | B1 | 5/2008 | Radosavljevic |
| 7,400,477 | B2 | 7/2008 | Campolo |
| 7,400,479 | B2 | 7/2008 | DiSalvo |
| 7,403,086 | B2 | 7/2008 | Wu |
| 7,408,432 | B2 | 8/2008 | Shi |
| 7,411,766 | B1 | 8/2008 | Huang |
| 7,414,499 | B2 | 8/2008 | Germain |
| 7,414,818 | B2 | 8/2008 | Shi |
| 7,439,833 | B2 | 10/2008 | Germain |
| 7,463,124 | B2 | 12/2008 | DiSalvo |
| 7,492,558 | B2 | 2/2009 | Germain |
| 7,492,559 | B2 | 2/2009 | Zhang |
| 7,498,909 | B2 | 3/2009 | Zhang |
| 7,498,910 | B2 | 3/2009 | Gallas |
| 7,515,024 | B2 | 4/2009 | Chen |
| 7,525,402 | B2 | 4/2009 | Gao |
| 7,525,441 | B2 | 4/2009 | Zhang |
| 7,535,371 | B2 | 5/2009 | Wang |
| 7,538,647 | B2 | 5/2009 | Leopold |
| 7,538,993 | B2 | 5/2009 | Huang |
| 7,538,994 | B2 | 5/2009 | Bonilla |
| 7,542,252 | B2 | 6/2009 | Chan |
| 7,545,244 | B2 | 6/2009 | DiSalvo |
| 8,054,590 | B2 | 11/2011 | Li et al. |
| 2004/0223272 | A1 | 11/2004 | Germain |
| 2006/0139132 | A1 | 6/2006 | Porter |
| 2006/0181373 | A1 | 8/2006 | Germain |
| 2006/0268472 | A1 | 11/2006 | Winch |
| 2006/0279886 | A1 | 12/2006 | Huang |
| 2006/0285262 | A1 | 12/2006 | Neiger |
| 2007/0014058 | A1 | 1/2007 | Chan |
| 2007/0030608 | A1 | 2/2007 | Baldwin |
| 2007/0035898 | A1 | 2/2007 | Baldwin |
| 2007/0053118 | A1 | 3/2007 | Germain |
| 2007/0133136 | A1 | 6/2007 | Germain |
| 2007/0188955 | A1 | 8/2007 | Elms |
| 2007/0215576 | A1 | 9/2007 | Chung |
| 2007/0230072 | A1 | 10/2007 | Zhang |
| 2007/0268635 | A1 | 11/2007 | Bonasia |
| 2007/0274012 | A1 | 11/2007 | Bonasia |
| 2008/0007879 | A1 | 1/2008 | Zaretsky |
| 2008/0022153 | A1 | 1/2008 | Wang |
| 2008/0024252 | A1 | 1/2008 | Gallas |
| 2008/0024945 | A1 | 1/2008 | Gao |
| 2008/0094765 | A1 | 4/2008 | Huang |
| 2008/0112099 | A1 | 5/2008 | Li |
| 2008/0123227 | A1 | 5/2008 | Bonasia |
| 2008/0170341 | A1 | 7/2008 | Huang |
| 2008/0186642 | A1 | 8/2008 | Campolo |
| 2008/0225448 | A1 | 9/2008 | Li |
| 2008/0272925 | A1 | 11/2008 | Griffin |
| 2009/0052098 | A1 | 2/2009 | DiSalvo |
| 2009/0086389 | A1 | 4/2009 | Huang |
| 2009/0091869 | A1 | 4/2009 | Huang |
| 2009/0128264 | A1 | 5/2009 | DiSalvo |

FOREIGN PATENT DOCUMENTS

| | | |
|---|---|---|
| WO | 2007056668 | 5/2007 |
| WO | 2007093885 | 8/2007 |
| WO | 2007137180 | 11/2007 |
| WO | 2007143576 | 12/2007 |
| WO | 2008005928 | 1/2008 |

* cited by examiner

ELECTRICAL WIRING DEVICE

CROSS-REFERENCE TO RELATED APPLICATIONS

This is a continuation of U.S. patent application Ser. No. 11/469,596 filed on Sep. 1, 2006, which is a continuation of U.S. patent application Ser. No. 10/884,304 filed on Jul. 2, 2004, which is a continuation of U.S. Pat. No. 6,856,498 filed on Oct. 5, 2001, which is a continuation of U.S. Pat. No. 6,522,510 filed Nov. 21, 2000, the contents of which are relied upon and incorporated herein by reference in their entirety, and the benefit of priority under 35 U.S.C. §120 is hereby claimed.

BACKGROUND OF THE INVENTION

1. Field of the Invention

The present invention relates generally to electrical wiring devices, and particularly to protective wiring devices.

2. Technical Background

An electrical distribution system provides power to a house, building or some other facility. Electrical wiring from a power utility provides AC power to one or more breaker panels disposed in the structure. The breaker panel distributes AC power to one or more branch electric circuits installed in the structure. The electric circuits may typically include one or more receptacle outlets and may further transmit AC power to one or more electrically powered devices, commonly referred to in the art as load circuits. The receptacle outlets provide power to user-accessible loads that include a power cord and plug, the plug being insertable into the receptacle outlet. However, certain types of faults have been known to occur in electrical wiring systems. Accordingly, each electric circuit typically employs one or more electric circuit protection devices.

There are several types of electric circuit protection devices. For example, such devices include ground fault circuit interrupters (GFCIs), ground-fault equipment protectors (GFEPs), and arc fault circuit interrupters (AFCIs). This list includes representative examples and is not meant to be exhaustive. Some devices include both GFCIs and AFCIs. As their names suggest, arc fault circuit interrupters (AFCIs), ground-fault equipment protectors (GFEPs) and ground fault circuit interrupters (GFCIs) perform different functions.

A ground fault occurs when a current carrying (hot) conductor creates an unintended current path to ground. A differential current is created between the hot/neutral conductors because some of the current flowing in the circuit is diverted into the unintended current path. The unintended current path represents an electrical shock hazard. A ground fault may occur for several reasons. First, the hot conductor may contact ground if the electrical wiring insulation within a load circuit becomes damaged. This scenario represents a shock hazard. For example, if a user comes into contact with a hot conductor while simultaneously contact ground, the user will experience a shock. A ground fault may also occur when the equipment comes in contact with water. A ground fault may also result from damaged insulation within the electrical power distribution system.

A ground fault creates a differential current between the hot conductor and the neutral conductor. Under normal operating conditions, the current flowing in the hot conductor should equal the current in the neutral conductor. Most GFCIs are configured to take advantage of this fact by comparing the current in the hot conductor to the current in the neutral conductor by sensing the differential current between the two conductors. The GFCI is sensitive to differential currents that represent an imminently dangerous condition, such as the presence of a current path other than the intended path of normal operation (i.e., a shock hazard). Accordingly, when the differential current exceeds a predetermined threshold, usually about 6 mA, the GFCI typically responds by interrupting the circuit. Circuit interruption is typically effected by opening a set of contacts disposed between the source of power and the load. The GFCI may also respond by actuating an alarm of some kind.

One problem associated with protective devices relates to the device being miswired in the filed by an installer. Miswiring refers to a situation wherein the installer couples the line terminals to the load and couples the load terminals to the AC power source. Miswiring may result in the protective device not protecting the user from the fault conditions described above. Labels and installation instruction sheets have been used to prevent miswiring. However, instructive material may be ignored by an installer.

Another problem is that protective device, like all electrical devices, have a limited life expectancy. When the device has reached end of life, the user may not be protected from the fault condition. Test buttons have been incorporated into protective devices to provide the user with a means for testing the effectiveness of the device. One drawback to this approach lies in the fact that if the user fails to use the test button, the user will not know if the device is functional.

Transient voltages are known to damage a protective device/cause an end of life condition. As a frame of reference, the power source of the electrical distribution system includes at least one phase voltage that propagates by way of the hot line in a properly wired device. Transient voltages, on the other hand, may likewise propagate in the electrical distribution system. However, the peak amplitudes of the transient voltages are typically greater than the phase voltage amplitude by an order of magnitude. Transient voltages may be generated in a number of ways. For example, transient voltages may be generated by lightning storms. Transient voltages may also be produced when an inductive load coupled to the electrical distribution system is turned off, or by a motor coupled to the electrical distribution system that includes commutators and brushes. Whatever the cause, transient voltages are known to damage a protective device and cause an end of life condition.

What is needed, therefore, is a protective device that addresses the miswiring issue by detecting the wiring state of the device and inhibiting device operation if the device is miswired. What is also needed is a protective device that includes circuitry that more effectively guards against damage from transient voltage surges.

SUMMARY OF THE INVENTION

The present invention addresses the needs described above by providing a protective device that detects the wiring state of the device and inhibits device operation if the device is miswired. The protective device of the present invention also has an indicator lamp which lights when the device is in the tripped condition and turns off when the device is reset. If the device is miswired after having been wired properly, the indicator lamp does not light when the device is tripped, and so provides a supplemental indication of miswiring. The protection circuit is powered from the hot line bus bar. The indicator lamp is also powered via the hot line bus bar of the interrupting contacts to meet safety standards. The protective device of the present invention also includes circuitry that more effectively guards against damage from transient voltage surges.

One aspect of the present invention is directed to an electrical wiring device that includes a plurality of line terminals including a line hot terminal and a line neutral terminal, and a plurality of load terminals including a load hot terminal and a load neutral terminal. An interrupting contact assembly includes four sets of interrupting contacts configured to provide electrical continuity at least between the line hot terminal and the load hot terminal and the line neutral terminal and the load neutral terminal in a reset state. The four sets of interrupting contacts are open in a tripped state. A miswire prevention arrangement is configured to prevent the interrupting contact assembly from maintaining the reset state when the load hot terminal and the load neutral terminal are connected to a source of AC power.

In another aspect, the present invention is directed to an electrical wiring device including a plurality of line terminals including a line hot terminal and a line neutral terminal, and a plurality of load terminals including a load hot terminal and a load neutral terminal. An interrupting contact assembly includes four sets of interrupting contacts configured to provide electrical continuity at least between the line hot terminal and the load hot terminal and the line neutral terminal and the load neutral terminal in a reset state. The four sets of interrupting contacts are open in a tripped state. A wiring state detection circuit includes a non-user actuatable switch element. The non-user actuatable switch element is configured to propagate a predetermined signal when the plurality of line terminals are properly connected to a source of AC power such that the interrupting contact assembly may establish the reset state, the wiring state detection circuit being substantially disabled after the plurality of line terminals are properly connected to a source of AC power.

In yet another aspect, the present invention is directed to an electrical wiring device that includes a plurality of line terminals including a line hot terminal and a line neutral terminal, and a plurality of load terminals including a load hot terminal, and a load neutral terminal. An interrupting contact assembly includes four sets of interrupting contacts configured to provide electrical continuity at least between the line hot terminal and the load hot terminal and the line neutral terminal and the load neutral terminal in a reset state. The four sets of interrupting contacts are open in a tripped state. A miswire prevention circuit is coupled between the line hot terminal and the line neutral terminal. The miswire prevention circuit is configured to generate a predetermined signal not simulating a predetermined fault condition in a properly wired state when the line hot terminal and the line neutral terminal are connected to a source of AC power. The miswire prevention circuit substantially prevents the interrupting contact assembly from effecting the reset state in a miswired state before generating the predetermined signal not simulating a predetermined fault condition.

In yet another aspect, the present invention is directed to an electrical wiring device that includes a plurality of line terminals including a line hot terminal and a line neutral terminal, a plurality of load terminals including a load hot terminal and a load neutral terminal. A fault detection circuit is coupled to the plurality of line terminals and configured to generate a fault detection signal in response to detecting a fault condition. A wiring state detection circuit is configured to detect a wiring state associated with the plurality of line terminals and the plurality of load terminals. The wiring state detection circuit is configured to generate a predetermined wiring state detection signal to indicate whether the plurality of line terminals are coupled to a source of AC power. A gated switch actuator is coupled to the wiring state detection circuit. The gated switch actuator is turned ON in response to the predetermined wiring state detection signal. An interrupting contact assembly is coupled to the gated switch actuator. The interrupting contact assembly includes interrupting contacts that provide electrical continuity between the plurality of line terminals and the plurality of load terminals in a reset state subsequent to the predetermined wiring state detection signal, the interrupting contact assembly being substantially prevented from effecting the reset state in a miswired state.

In yet another aspect, the present invention is directed to an electrical wiring device that includes a plurality of line terminals including a line hot terminal and a line neutral terminal, a plurality of load terminals including a load hot terminal and a load neutral terminal. A wiring state detection arrangement is coupled between the plurality of line terminals, the wiring state detection arrangement including a circuit component configured to open circuit in response to detection of a proper wiring state. A fault detection assembly is coupled to the plurality of line terminals and configured to generate a fault detection signal in response to detecting a fault condition. An interrupting contact assembly is coupled to the wiring state detection arrangement and the fault detection assembly. The interrupting contact assembly includes four sets of interrupting contacts that are configured to provide electrical continuity between the plurality of line terminals and the plurality of load terminals in a reset state and configured to interrupt the electrical continuity in tripped state. The interrupting contact assembly is configured to trip the four sets of interrupting contacts in response to the fault detection signal. The interrupting contact assembly is substantially prevented from effecting the reset state until the circuit component open circuits in response to detection of the proper wiring state.

In yet another aspect, the present invention is directed to a protection device that includes a plurality of line terminals and a plurality of load terminals. A fault detection circuit is responsive to at least one fault condition in an electrical distribution system. The fault detection circuit includes a fault sensor configured to generate a sensor signal in response to sensing perturbations in the electrical distribution system. The fault detection circuit also includes a fault detector coupled to the sensor. The fault detector generates a fault detection signal based on predetermined signal characteristics of the sensor signal. An interrupting contact assembly is coupled to the fault detection circuit and configured to provide electrical continuity at least between the line hot terminal and the load hot terminal and the line neutral terminal and the load neutral terminal in a reset state. The interrupting contact assembly is configured to interrupt the electrical continuity in a tripped state in response to the fault detection signal. A miswire circuit is coupled between the plurality of line terminals, the miswire circuit includes a non-user accessible component characterized by a variable impedance. The non-user accessible component is configured to propagate signal perturbations greater than a predetermined amount for a predetermined period of time when power is applied to the miswire circuit. The signal perturbations are configured to enable the reset state to be effected thereafter. The signal perturbations propagated by the non-user accessible component are eliminated or substantially less than the predetermined amount after the predetermined period of time has elapsed.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Reference will now be made in detail to the present embodiments of the invention, examples of which are illustrated in the accompanying drawings. Wherever possible, the same reference numbers will be used throughout the drawings to refer to the same or like parts. An exemplary embodiment of the wiring device of the present invention is shown in FIG. 1, and is designated generally throughout by reference numeral 100.

Figure 1:
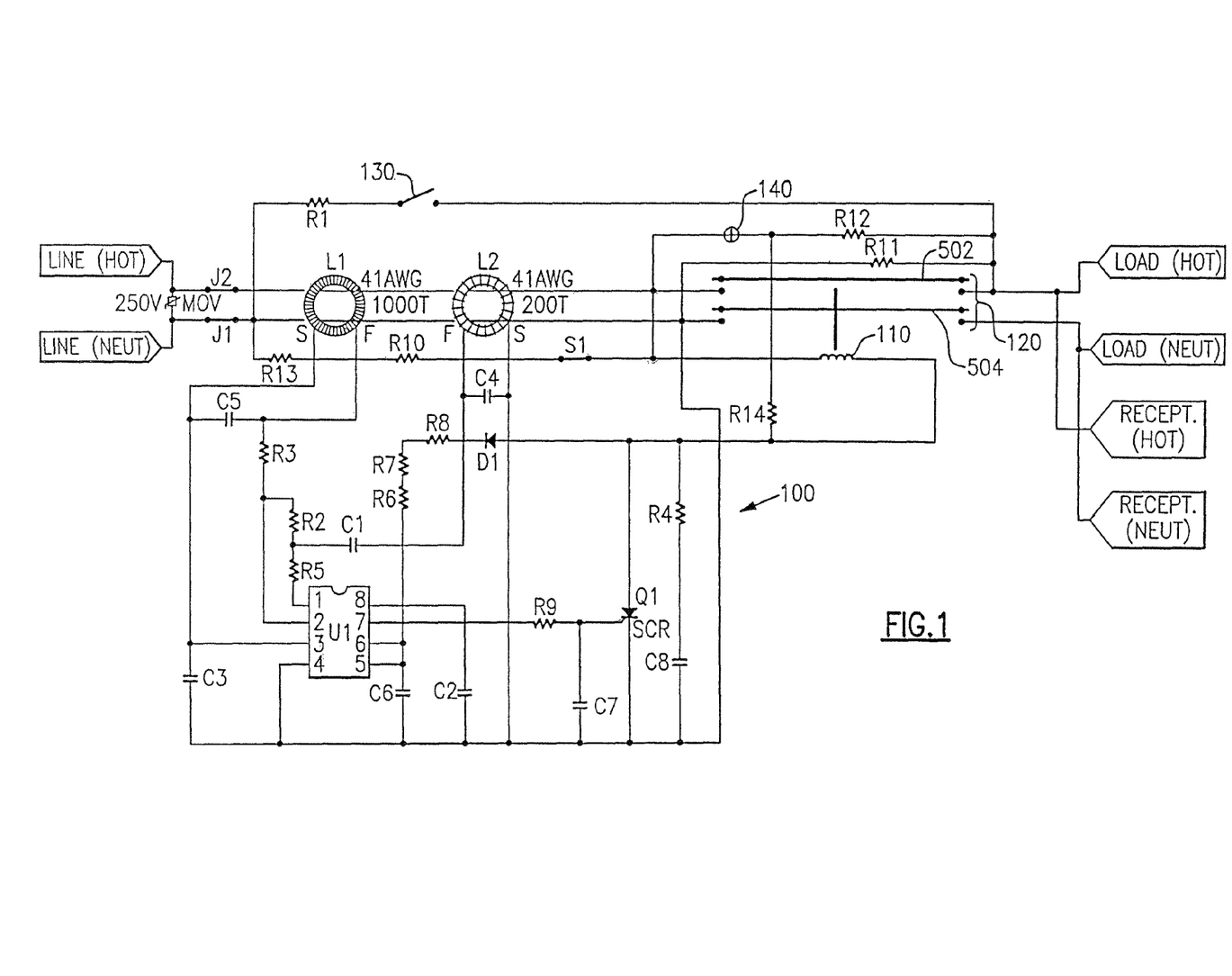
FIG. 1 is a schematic of a GFCI circuit with miswire protection and an indicator lamp according to an embodiment of the invention.

As embodied herein and depicted in FIG. 1, a schematic of a GFCI circuit with miswire protection and an indicator lamp 140 in accordance with an embodiment of the invention is disclosed. The GFCI 100 includes sensing transformers L1 and L2. These transformers are coupled to detector U1. The ground fault circuit sensing electronics of GFCI circuit 100 derives power from the line side terminals of the GFCI. When differential transformer L1 senses unequal amounts of current flowing in the hot and neutral conductors due to a ground fault condition, circuit 100 causes a breaker coil 110 to activate, opening circuit interrupting mechanism 120. Circuit interrupting mechanism 120 includes hot and neutral bus bars 502, 504 that make and break contact with the hot and neutral power lines, respectively. The circuit interrupting mechanism includes four sets of contacts that couple the bus bars to the hot line conductive path to the hot load conductive path and the neutral line conductive path to the neutral load conductive path. As shown in FIG. 1, each bus bar includes two sets of contacts that bridge a line conductive path to a corresponding load conductive path.

GFCI 100 includes a test button 130 induces a simulated ground fault when pushed in and causes breaker coil 110 to activate. In other words, the simulated ground fault generates a differential signal that is sensed and detected by the GFCI circuitry.

GFCI 100 is also equipped with a wiring state detection circuit that includes a fault resistance (R10, R13) that generates a differential current on the primary of the differential current transformer L1 when the GFCI 100 is miswired. The miswire differential current exceeds the level of differential current that the GFCI has been designed to interrupt, typically 6 milliamperes. The fault resistance R10, R13 is on the line side of interrupting contacts 120 electrically located between the line and load terminals of the hot and neutral wire paths. If GFCI 100 is miswired such that power is supplied to the load terminals and GFCI 100 is tripped the detection circuit does not provide a visible miswire indication. Accordingly, the user will attempt to reset the device. At this point, the miswire circuit will generate a differential current and the device will immediately trip. Thus, the device trips every time the user attempts to reset it, signaling to the user that the device is miswired.

When electrical power is correctly connected to the line terminals, it will trip only once (if it is in the reset state). If the device is already in the tripped state, nothing visible happens. Once the device is reset, it will not trip again unless it is responding to a test input or a true fault condition.

The wiring state detection circuit operates as follows. The current that flows through the fault resistance (R10, R13) is derived from the line terminal side of the device. When electrical power is correctly connected to the line terminals, the miswire circuit generates a differential current. If the device is in the reset state, the device will trip in response to the differential current. However, current continues to flow through fault resistance R10, R13 even if the interrupting contacts 120 are open. The differential current generated by the fault resistance clears itself in a short time, typically about 300 ms. The clearance timing is effected by selecting a resistor or resistors whose power rating is greatly exceeded by the current. Thus, the resistor or resistors will open after the predetermined time has elapsed. The estimated time it takes for the fault resistors R10, R13 to "clear" or burn out is greater than 50 ms and typically about 300 ms. After the fault resistance clears, the device may be reset. It will not trip again unless it is responding to a test input or a true fault condition. If the device is already in the tripped condition before power is applied, the wiring state detection circuit again generates the differential current despite the fact that the device is already tripped and the process described above occurs without the intermediate tripping step. This, of course, occurs without the user's knowledge because nothing appears to be happening in the GFCI.

On the other hand, the current flow is interrupted when the device trips in the miswired state. This is because, as noted above, the detection circuit derives power from the line side. Because the trip time of the GFCI is less than or equal to 25 ms, fault resistors R10, R13 do not have enough time to clear. If one attempts to reset the device when in the miswired condition, the device immediately trips out again, and this continues until such time as the device is wired correctly, that is, when power is applied to the GFCI at the line terminals. This effectively results in a GFCI that will not operate, i.e., be able to be reset, until such time as the device is properly wired.

In another embodiment, a fuse (F1 in FIG. 3) is placed in series with the fault resistance R10, R13. Fuse F1 has a properly selected ht rating such that the fuse blows instead of the fault resistance R10, R13. Accordingly, the term "resistive element" as used herein refers to either a resistance or a fuse. Once the device has been properly wired by connecting AC power to the line terminals the device is reset operates normally.

Two interesting issues with this miswire protection concept are how to perform the Underwriters Laboratories Standard 943 required tests during manufacturing of the protective device without the differential current produced by the fault resistor affecting the test results, or causing the fault resistor to clear in the manner previously described.

One solution is to place a normally closed switch S1 in series with the fault resistance R10, R13 previously described as producing the differential current. This switch S1 is preferably a flexible conductive spring arm that normally rests against a contact on the top side of the printed circuit board. Directly below the spring arm of switch S1 is a hole in the printed circuit board, and below this hole is another hole in the plastic back body of the GFCI device. When the GFCI is loaded into a piece of test equipment designed to perform the required manufacturing tests, a mechanical test probe engages the spring arm of switch S1 through the two aforementioned holes, causing the spring arm of switch S1 to be pushed away from the contact and therefore opening the differential current circuit path. Manufacturing testing can now be performed without any circuit effect from this path, without burning out fault resistance R10, R13. The last test performed on the GFCI device in the test sequence is to disengage the probe from the spring arm of switch S1, which reconnects the differential current circuit path. Line voltage is then applied to the load contacts. The differential current causes the GFCI to trip, thereby checking the integrity of the differential current circuit path and components.

Another feature of the GFCI of the present invention relates to the indicator circuit that includes light element 140, and resistors R11, R12, R14. The indication device may be implemented as a neon light. Indicator 140 has multiple indication meanings. The first function of light 140 is as a trip indicator. The light is off if the GFCI is in the reset condition, and illuminates if the GFCI trips. The second function of light 140 is to indicate miswiring. A third function of light 140 is to notify the user that the GFCI is no longer operational because of a defective solenoid-driving device.

When the GFCI is wired properly such that the AC power source is connected to the line terminals and the contacts 120 are closed, there is no voltage across light 140 and resistor R12. Accordingly, light 140 is not energized. If the GFCI trips for any reason, line voltage is applied across indicator 140 and resistors R12 and R11 and light is emitted. When the device is reset, voltage is removed and light 140 is deenergized. As noted above, when the device is miswired it will continue to trip out immediately after reset. However, the user will notice that light 140 is not energized after tripping occurs. Of course, in the miswired state, there is no return path to neutral through resistor R11. Note that the wiring state detection functionality of the indicator circuit feature is not dependent on the fault resistance R10, R13. Accordingly, wiring state detection is provided by the present invention even if the miswire detection circuit has been previously used and the fault resistance cleared.

Indicating a defective solenoid driving device, such as SCR Q1, is achieved with the addition of a resistor R14. Light 140 is energized when the SCR Q1 short circuits because resistor R14 provides a path to supply neutral. When this occurs, and the device is reset, the GFCI trips, energizing light 140 through resistor R14. Continuously applied line voltage to the solenoid occurring as a result of a shorted SCR Q1 causes the trip solenoid (coil 110) to open within a few seconds. Coil 110 burns out since it is continuously energized, so it cannot trip again after the device is reset. When the GFCI is reset in this condition, light 140 remains energized, indicating a defective solenoid driving device. The value of resistor R14 must be kept low relative to the value of resistor R12 as a voltage divider occurs between resistors R12 and R14 which limits the voltage across light 140. A neon lamp needs a minimum of about 60 volts to arc over and energize. A value of 33K for resistor R14 is suitable for this embodiment, which provides for about 66 volts across the neon lamp at a worst case line voltage of 102 VAC. Computing different values for resistors R11, R12, and R14 based on different types of lights 140 is considered within the capabilities of one skilled in the art.

Yet another feature of the present invention relates to the voltage transient protection circuitry. The present invention includes a low pass filter circuit coupled in parallel with a metal-oxide varistor (MOV) across the hot line terminal and the neutral line terminal. The low pass filter includes capacitor C8 coupled in series with solenoid 110. The low pass filter circuit does what its name suggests, it filters out high frequency voltage components. Accordingly, the GFCI of the present invention is more likely to survive transient overvoltages than a GFCI without the low pass filter, or a GFCI without the low pass filter in combination with the MOV.

Figure 2:
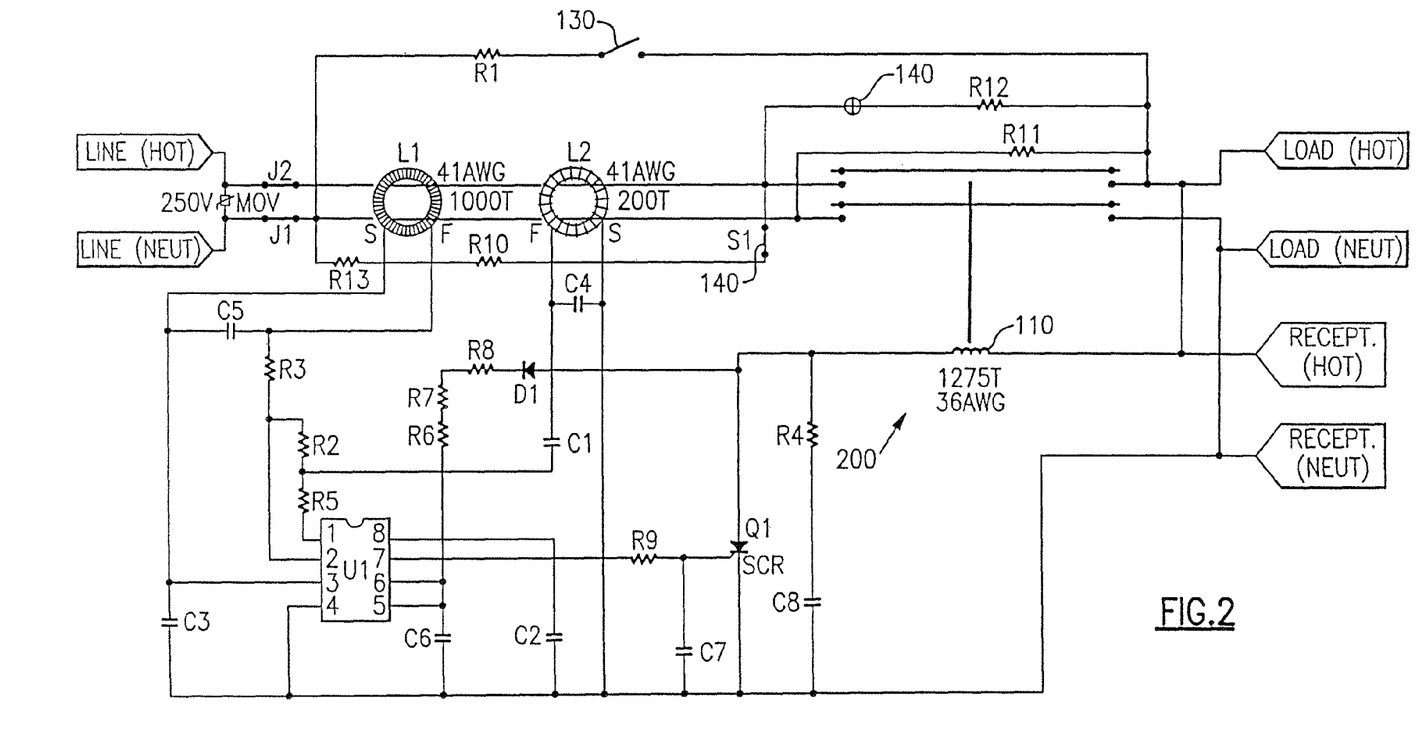
FIG. 2 shows a schematic of a lockout configuration according to an embodiment of the invention.

As embodied herein and depicted in FIG. 2, a schematic of a lockout configuration according to an embodiment of the invention is disclosed. In this embodiment of the invention, the protection device cannot be rest if the SCR shorts out, i.e., the device is "locked out." This is because breaker coil 110 draws its power from the load sides of contacts 120 instead of the line side as in the embodiment of FIG. 1. When the SCR shorts out, breaker coil 110 immediately trips and opens contacts 120. Opening contacts 120 breaks the current to the load side of the device, so breaker coil 110 is de-energized, preventing it from burning out. When attempting to reset the device, breaker coil 110 immediately trips out contacts 120, thus preventing the device from being reset. Since the device cannot be reset, resistor R14 is not used in this embodiment because there is no need to indicate via light 140 that the device has a faulty SCR; the inability to reset the device signals that condition.

Figure 3:
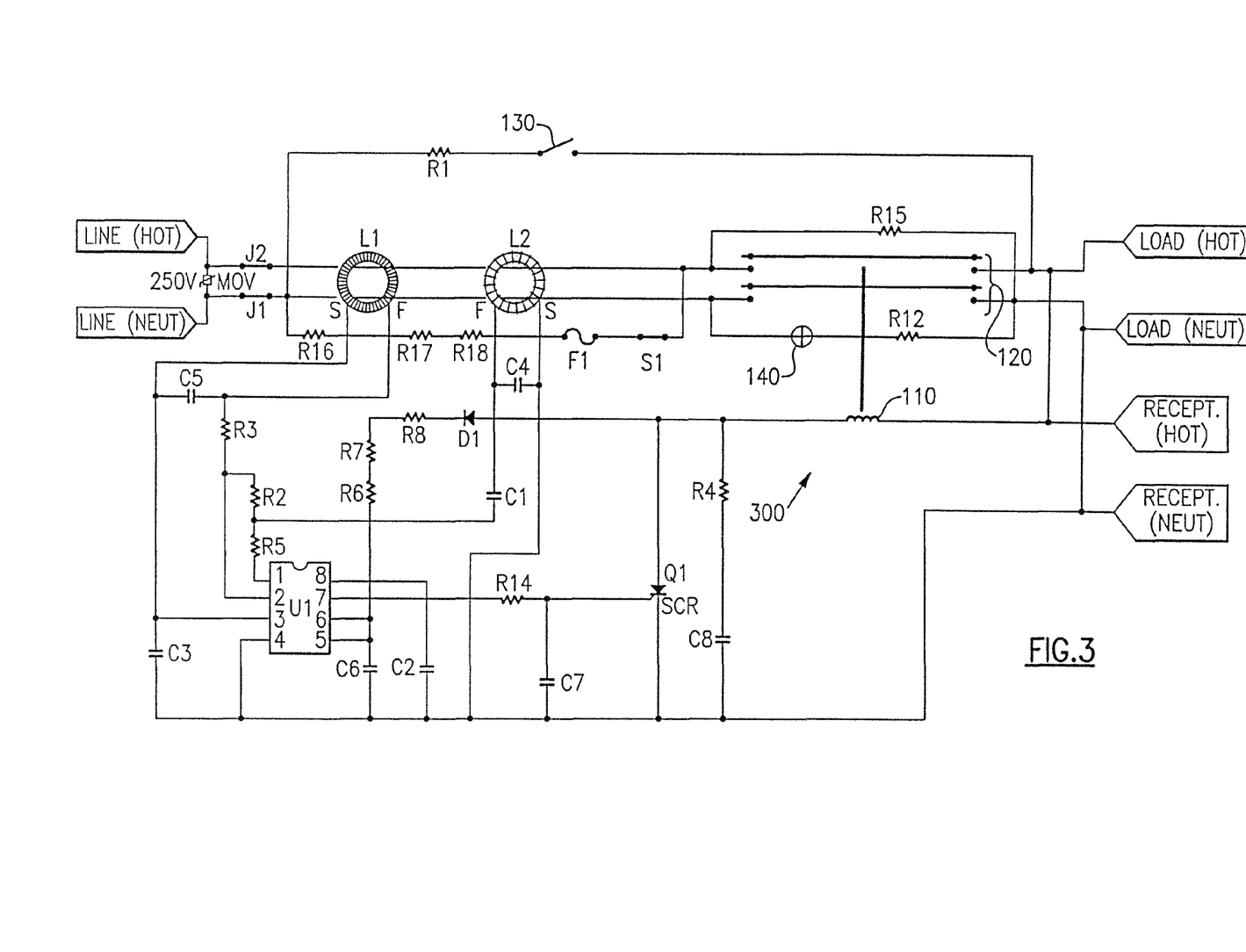
FIG. 3 shows a schematic of an alternative lockout configuration according to an embodiment of the invention.

Referring to FIG. 3, an alternative lock-out embodiment is shown at 300 which shows the series combination of light 140 and resistor R12 connected in parallel to the neutral conductor contact instead of the hot conductor contact as is the case in FIGS. 1 and 2. A resistor R15 completes the light circuit from load neutral to line hot. The miswire circuit fault resistance is shown here as resistors R16, R17, and R18 in series with fuse F1. This embodiment eliminates any trickle current that might be flowing if the device is miswired.

Figure 4:
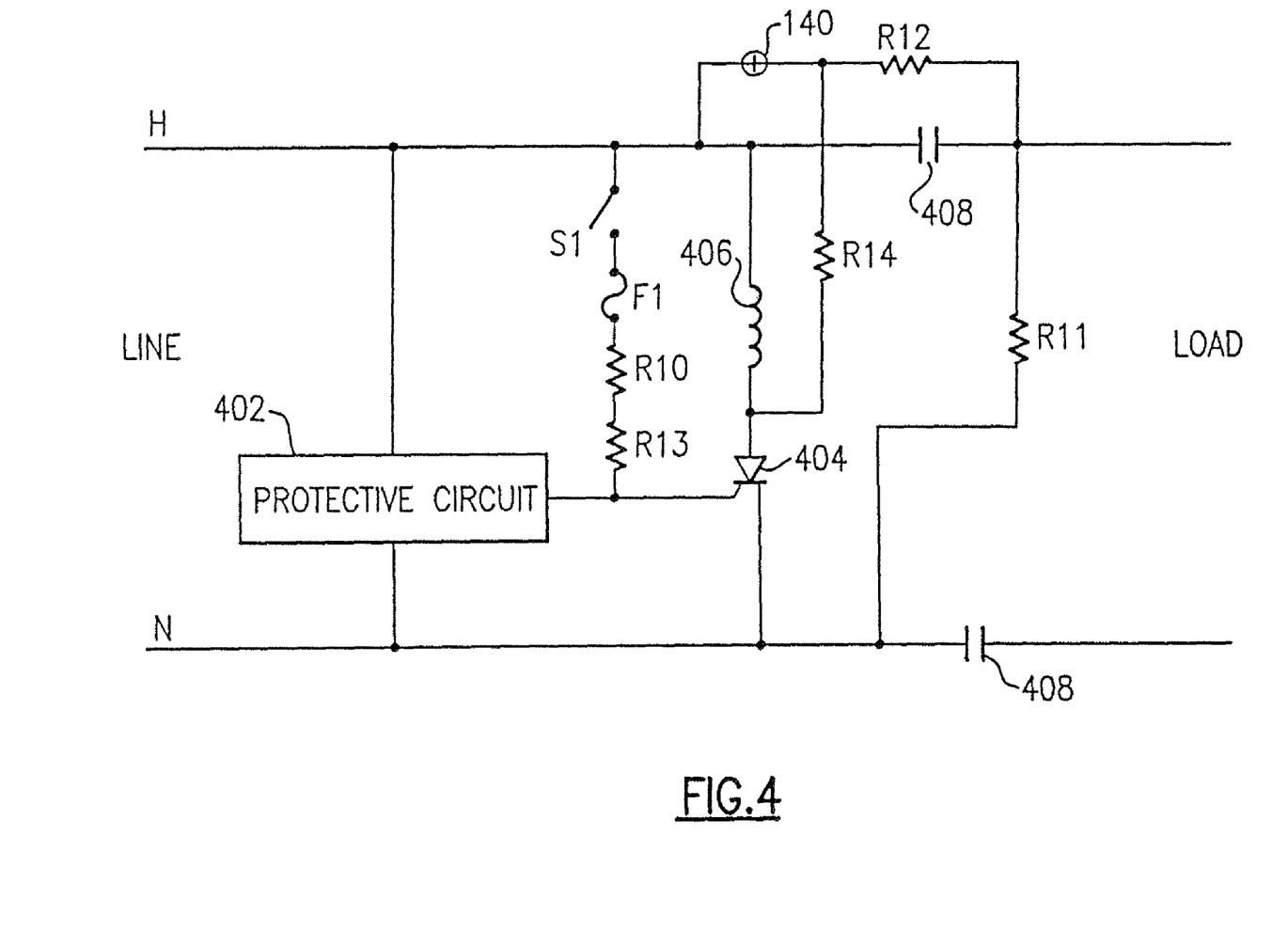
FIG. 4 shows a schematic of a protective circuit with miswire protection and an indicator lamp according to an embodiment of the invention.

Referring to FIG. 4, an embodiment of the invention is shown at 400 in which the protection device can be reset if the SCR shorts out. The embodiment is similar to the one shown in FIG. 1 except that it is generalized to apply to different protective devices such as ground fault circuit interrupters (GFCI's) or devices intended to interrupt ground faults from personnel contact with a power line conductor, arc fault circuit interrupters (AFCI's) intended to interrupt line current which if allowed to continue could cause an electrical fire, combination devices that provide both AFCI and GFCI protection, or the like.

According to this embodiment, the protective devices mentioned have a protective circuit 402 that detects the respective fault condition, turning on an electronic switching device such as SCR 404, energizing a solenoid 406 coil which receives power from the line conductors, to open interrupting contacts 408. Resistors R11, R12, R14, fault resistors R10, R13, normally closed switch 51, fuse F1, and light 140 have the same functions as previously described in the above embodiments. When power is miswired to the load terminals and the protective device is reset such that interrupting contacts 408 are closed, current flows are normally closed switch S1, fuse F1, fault resistors R10, R13 and the gate-cathode junction of SCR 404, energizing solenoid 406 and tripping the interrupting contacts 408. Fuse F1 and fault resistors R10, R13 are chosen to withstand the current flow for the time that power is applied to the load terminals to the moment when interrupting contacts 408 open, approximately 25 milliseconds. If line power is connected as intended to the line terminals of the protective device, current flows through normally closed switch S1, fuse F1, fault resistors R10, R13, and the gate cathode junction of SCR 404 until such time as fuse F1 clears, after which it is possible to accomplish a resetting of the interrupting contacts 408. Solenoid 406 is designed not to burn out during the interval that SCR 404 is conductive, which interval is designed to be approximately 100 milliseconds. In this manner the protective functions described in FIG. 1 are provided without necessarily requiring a differential current transformer L1 in the construction of the protective device nor attachment of the fault resistor and fuse circuit to both the hot and neutral line conductors. If an electronic switching device other than an SCR is used, e.g., a bipolar transistor, the connections shown here are being made to the gate of the SCR would instead be made to the base of the bipolar transistor. "Gate" and "base" are intended to have an equivalent meaning in this specification and claims.

A high voltage dielectric test requirement in the present UL Standard. This test is performed by applying a high voltage potential between line hot and load hot (and again between line neutral and load neutral) with the GFCI in the tripped condition. The light indication circuit connection between line and load hot in the previous embodiments may result in a test failure. Another potential relates to the maximum "leakage" current (Approximately 0.5 mA). The maximum allowable current may not be sufficient to drive an LED to achieve the desired light output in the indicator light.

Figure 5:
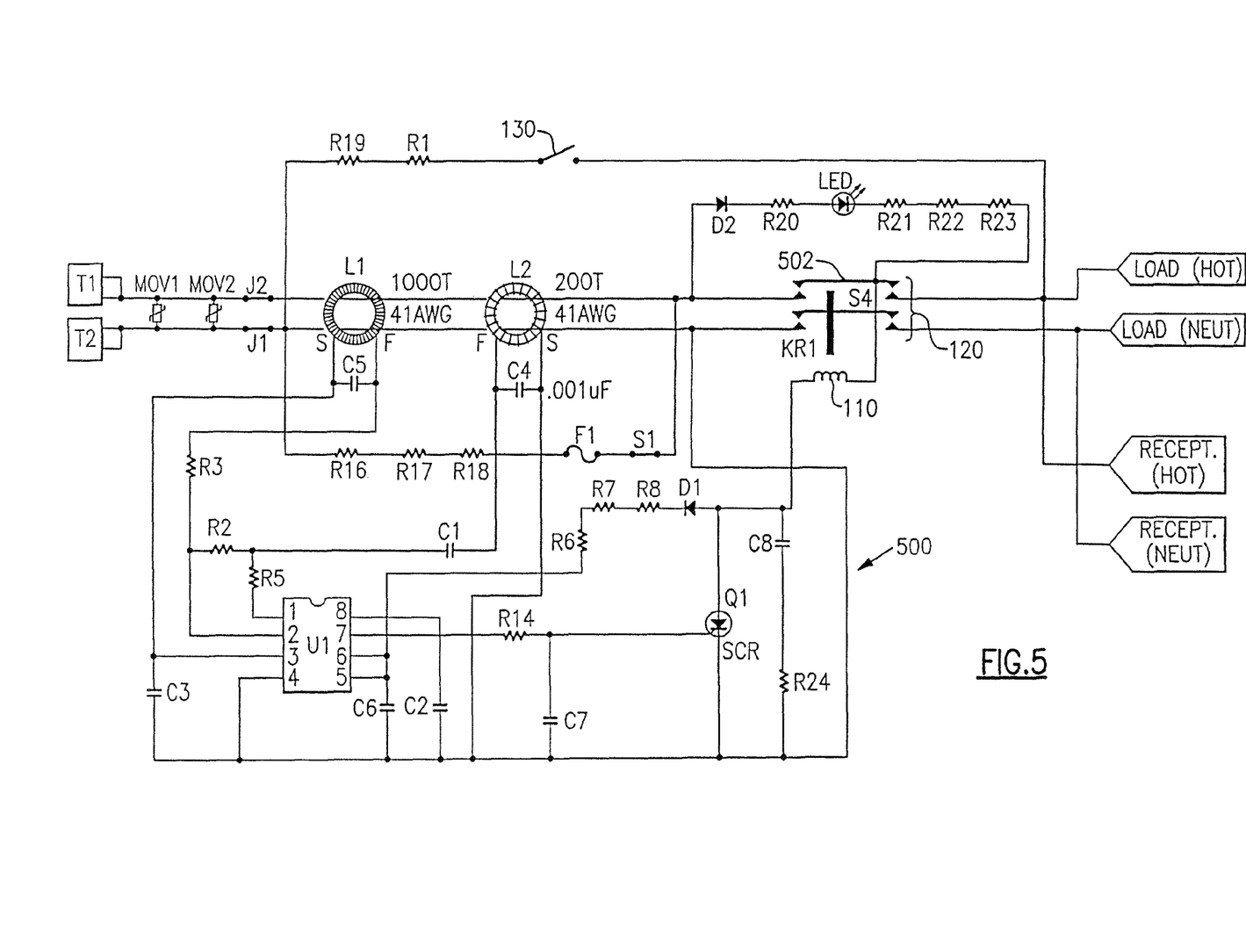
FIG. 5 shows a schematic of a protective circuit with miswire protection and an indicator lamp according to an embodiment of the invention.

Referring to FIG. 5, a circuit 500 is shown in which circuit power is derived from hot bus bar 502 of the tripping mechanism. Circuit 500 still meets the original circuit requirements of removing power to the SCR when the SCR shorts. When power is applied and the GFCI is in the reset condition, bus bar 502 is in contact with the line hot, so the circuit is powered. When a ground fault is senses by differential transformer L1, the GFCI device of this embodiment trips normally.

Another function of the original circuit was to have an indicator light that came on as a result of the GFCI tripping when the GFCI was correctly wired, but when the GFCI was miswired by bringing power to the load contacts, the indicator light would not energize when the GFCI was tripped. The indicator circuit of this embodiment includes a diode D2 in series with resistors R20, R21, R22, and R23, and an LED. When the properly wired GFCI trips and the SCR is not shorted out, bus bar 502 which provides power to circuit 500 is removed from contact with line hot. Current then flows through the indicator circuit, coil 110, diode D1, and resistors R6, R7, R8 to provide the power to illuminate the LED. Nominal current through the LED is about 4 ma.

The indicator circuit works in conjunction with the GFCI sense circuitry to power the indicator and to protect coil 110 in the event that the SCR shorts out. When the properly wired GFCI trips due to the SCR shorting, current still flows through the indicator circuit, coil 110, and then through the shorted SCR. Nominal current in this scenario is about 10 ma. Coil 110 is protected from burning out by the resistor chain R20, R21, R22, and R23. Diode D1 serves to half wave rectify the voltage for circuit 500, protects the LED from breaking over in the reverse direction when the GFCI is tripped, and halves the power across resistor chain R20, R21, R22, and R23 when the SCR shorts out.

When the GFCI is miswired, i.e., when the power is applied to the load terminals of the device instead of the line terminals of the device, the LED cannot light because there is no path for the current to take when the device is tripped. Thus, if the device is tripped and no light appears, the installer knows that the device is miswired.

Although the invention is described with respect to a GFCI, the invention is equally applicable to an AFCI or indeed to any circuit interrupting device.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A ground fault circuit interrupter receptacle comprising:
a plurality of line terminals, a plurality of load terminals, and at least one receptacle;
a ground fault detection circuit coupled to the plurality of line terminals, the ground fault detection circuit including a power supply circuit configured to provide a rectified power signal to the ground fault detection circuit, the rectified power signal being derived from a source AC power;
a circuit coupled to the plurality of line terminals and configured to provide a predetermined response if the plurality of line terminals are properly connected to the source of AC power, the circuit comprising a switch element including switch contacts;
a solenoid coil coupled to the circuit; and an interrupting contact assembly including four sets of interrupting contacts configured to provide electrical continuity between the plurality of line terminals, the plurality of load terminals and the at least one receptacle in a reset state and decouple the four sets of interrupting contacts in a tripped state, the switch contacts opening independently of an opening of the four sets of interrupting contacts and closing independently of a closing of the four sets of interrupting contacts, the interrupting contact assembly being substantially prevented from effecting the reset state until an occurrence of the predetermined response.

2. The device of claim 1, wherein the response includes an open circuit condition.

3. The device of claim 1, wherein the response includes a predetermined current flow.

4. The device of claim 3, wherein the predetermined current flow does not simulate a fault condition.

5. The device of claim 3, wherein the interrupting contact assembly is substantially prevented from effecting the reset state absent the predetermined current flow.

6. The device of claim 3, wherein the predetermined current flow is conducted when the switch contacts are closed.

7. The device of claim 3, wherein the circuit is opened after the predetermined current flow is conducted.

8. The device of claim 3, wherein the current flow causes the solenoid coil to be energized.

9. The device of claim 3, wherein the predetermined current flow causes a simulated fault condition.

10. The device of claim 1, wherein the reset state is effected by a user stimulus.

11. The device of claim 1, wherein one of the line terminals, a corresponding one of the load terminals and the receptacle are electrically connected when in the reset state and electrically disconnected when in the tripped state.

12. An electrical wiring device comprising:
a plurality of line wire terminals, a plurality of load wire terminals and at least one receptacle load terminal, the device being properly wired when the plurality of line wire terminals are connected to electrical wires coupled to a source of AC power, the device being miswired when the plurality of load wire terminals are connected to electrical wires coupled to the source of AC power;
a fault detection circuit coupled to the plurality of line wire terminals, the fault detection circuit including a power supply circuit configured to provide a rectified power signal to the fault detection circuit, the rectified power signal being derived from the source of AC power, the fault detection circuit being and configured to generate a fault detection signal in response to detecting a fault condition or a simulated fault condition;
at least one circuit including at least one switch element, the at least one circuit being configured to conduct a predetermined signal derived from the source of AC power when the at least one switch element is closed, the predetermined signal being indicative of a proper wiring condition; and
a circuit interrupter assembly coupled to the at least one circuit, the circuit interrupter assembly including four sets of interrupting contacts that are configured to provide electrical continuity between the plurality of line wire terminals, the plurality of load wire terminals and the at least one receptacle load terminal in a reset state, the electrical continuity being interrupted in tripped state, the at least one switch element opening independently of an opening of the four sets of interrupting contacts and closes independently of a closing of the four sets of interrupting contacts, the circuit interrupter assembly being substantially prevented from effecting the reset state absent the predetermined signal.

13. The device of claim 12, wherein the reset state is effected by a user stimulus.

14. The device of claim 12, wherein the predetermined signal is conducted through the at least one switch element.

15. The device of claim 12, wherein the predetermined signal causes the simulated fault condition.

16. The device of claim 12, further comprising an electronic switch coupled to a solenoid.

17. The device of claim 16, wherein the predetermined signal turns the electronic switch ON to thereby energize the solenoid.

18. The device of claim 16, wherein the solenoid is a trip solenoid.

19. The device of claim 12, wherein the at least one switch is open during a time interval before the predetermined signal is conducted and the at least one circuit is opened after the predetermined signal is conducted.

20. The device of claim 12, further comprising including at least one first conductive path coupled to one of the plurality of line wire terminals, at least one second conductive path coupled to one of the load wire terminals, and at least one third conductive path, the four sets of interrupting contacts being closed to connect the at least one first conductive path, the at least one second conductive path and the at least one third conductive path in the reset state.

21. The device of claim 12, wherein the at least one switch element includes a contact disposed on a printed circuit board.

22. The device of claim 12, wherein the at least one circuit includes a circuit component that is open circuited in response to conduction of the predetermined signal.

23. The device of claim 12, wherein the predetermined signal does not simulate a fault condition.

24. An electrical wiring device comprising:
a plurality of line wire terminals, a plurality of load wire terminals and at least one receptacle load terminal, the device being properly wired when the plurality of line wire terminals are connected to electrical wires coupled to a source of AC power, the device being miswired when the plurality of load wire terminals are connected to the electrical wires coupled to the source of AC power;
a ground fault detection circuit coupled to the plurality of line wire terminals or the plurality of load wire terminals, the ground fault detection circuit including a power supply circuit configured to provide a rectified power signal to the ground fault detection circuit, the rectified power signal being derived from a source AC power;
a wiring state circuit coupled to the plurality of line wire terminals, the wiring state circuit including at least one switch element, the wiring state circuit being configured to effectuate a predetermined response when the plurality of line wire terminals are properly connected to the source of AC power and the at least one switch element is closed, the wiring state circuit being open circuited after the predetermined response;
a solenoid coil coupled to the wiring state detection circuit; and
a circuit interrupter including four sets of interrupting contacts configured to provide electrical continuity between the plurality of line wire terminals, the plurality of load wire terminals and the at least one receptacle load terminal in a reset state and decoupling the four sets of interrupting contacts in a tripped state, the at least one switch element opening independently of an opening of the four sets of interrupting contacts and closes independently of a closing of the four sets of interrupting contacts, the circuit interrupter being substantially prevented from effecting the reset state until an occurrence of the predetermined response.

25. The device of claim 24, wherein the at least one switch is open during a time interval before the predetermined response is effectuated and the at least one circuit is opened after the predetermined response is effectuated.

26. The device of claim 24, wherein the solenoid coil is energized in response to the predetermined response.

27. The device of claim 26, wherein the solenoid coil is a trip solenoid coil.

28. The device of claim 24, wherein the at least one switch element includes at least one contact coupled to a printed circuit board.

29. The device of claim 24, wherein the predetermined response includes a predetermined current flow.

30. The device of claim 29, wherein the predetermined current flow does not simulate a fault condition.

31. The device of claim 29, wherein the predetermined current flow is conducted when the at least one switch element is closed.

32. The device of claim 29, wherein the circuit is opened after the predetermined current flow is conducted.

33. The device of claim 29, wherein the current flow causes the solenoid coil to be energized.

* * * * *